United States Patent
Maamari et al.

(10) Patent No.: US 12,279,252 B2
(45) Date of Patent: Apr. 15, 2025

(54) FLEXIBLE UPLINK TRANSMISSION WITH UCI COLLISIONS

(71) Applicant: QUALCOMM Incorporated, San Diego, CA (US)

(72) Inventors: Diana Maamari, San Diego, CA (US); Ahmed Elshafie, San Diego, CA (US); Wei Yang, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/807,336

(22) Filed: Jun. 16, 2022

(65) Prior Publication Data

US 2023/0413262 A1 Dec. 21, 2023

(51) Int. Cl.
*H04W 72/04* (2023.01)
*H04L 1/00* (2006.01)
*H04L 27/26* (2006.01)
*H04W 72/1268* (2023.01)
*H04W 72/21* (2023.01)

(52) U.S. Cl.
CPC ....... *H04W 72/1268* (2013.01); *H04L 1/0003* (2013.01); *H04L 27/2605* (2013.01); *H04W 72/21* (2023.01)

(58) Field of Classification Search
CPC ... H04L 1/0003; H04L 1/0025; H04L 1/0073; H04L 27/2602; H04L 27/2605; H04L 5/001; H04L 5/0023; H04L 5/0048; H04L 5/0051; H04L 5/0053; H04L 5/0055; H04L 5/0094; H04W 72/1268; H04W 72/21
See application file for complete search history.

(56) References Cited

U.S. PATENT DOCUMENTS

| 12,047,324 B2 * | 7/2024 | Lee | H04L 5/0055 |
| 2017/0208581 A1 * | 7/2017 | Yang | H04L 5/0057 |
| 2021/0022143 A1 * | 1/2021 | Xiong | H04L 5/10 |
| 2022/0182207 A1 * | 6/2022 | Papasakellariou | H04L 5/0055 |

FOREIGN PATENT DOCUMENTS

| AU | 2020207206 A1 * | 7/2021 | H04L 1/1812 |
| CN | 102783230 A * | 11/2012 | H04B 7/024 |

OTHER PUBLICATIONS

US 12,047,956 B2, 07/2024, Bae (withdrawn)*

* cited by examiner

*Primary Examiner* — Phuc H Tran
(74) *Attorney, Agent, or Firm* — Procopio, Cory, Hargreaves & Savitch LLP

(57) ABSTRACT

Apparatus, methods, and computer program products for flexible uplink transmission are provided. An example method may include receiving a configuration of resources for a PUCCH or a PUSCH associated with UCI, where the configuration of resources may be received from a network entity, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. The example method may further include transmitting at least one of the UCI or the uplink transmission to the network entity.

10 Claims, 18 Drawing Sheets

FLEXIBLE UPLINK TRANSMISSION WITH UCI COLLISIONS

TECHNICAL FIELD

The present disclosure relates generally to communication systems, and more particularly, to wireless communication systems with uplink control information (UCI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive a configuration of resources for a physical uplink control channel (PUCCH) or a physical uplink shared channel (PUSCH) associated with uplink control information (UCI), where the configuration of resources may be received from a network entity, where the UCI indicates a set of resources corresponding to a transmission in a first subset of resources associated with the PUSCH and a skipped transmission in a second subset of resources associated with the PUSCH or indicates an modulation and coding scheme (MCS) for the PUSCH, where the UCI would overlap with an uplink transmission, where the set of resources may include the first subset of resources and the second subset of resources. The memory and the at least one processor coupled to the memory may be further configured to transmit at least one of the UCI or the uplink transmission to the network entity.

In another aspect of the disclosure, a method, a computer-readable medium, and an apparatus at a network entity are provided. The apparatus may include a memory and at least one processor coupled to the memory. The memory and the at least one processor coupled to the memory may be configured to transmit a configuration of resources for a physical uplink control channel (PUCCH) or a physical uplink shared channel (PUSCH) associated with uplink control information (UCI), where the configuration of resources may be transmitted for a user equipment (UE), where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. The memory and the at least one processor coupled to the memory may be further configured to receive at least one of the UCI or the uplink transmission from the UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
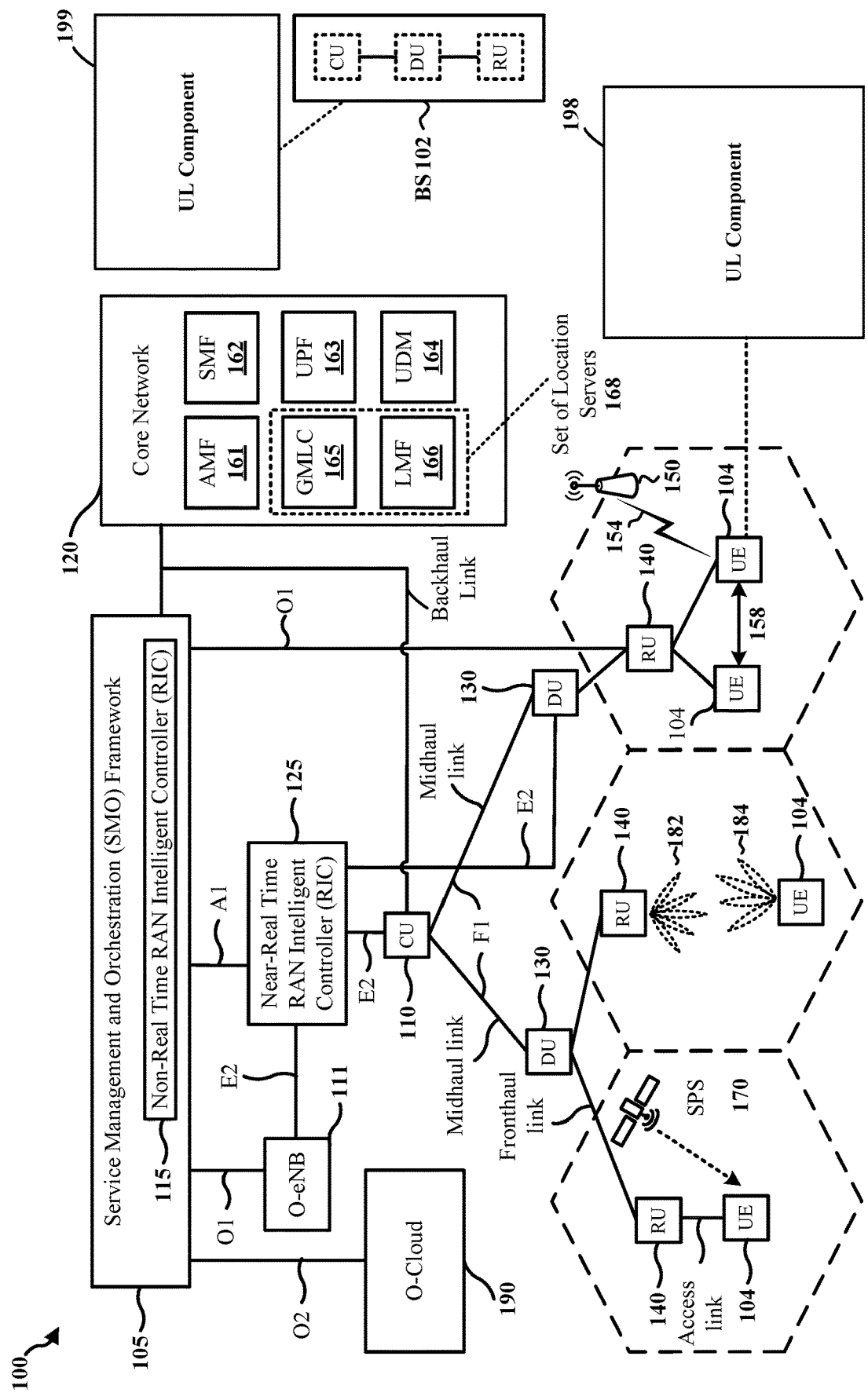
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, and access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a UL component 198. In some aspects, the UL component 198 may be configured to receive a configuration of resources for a physical uplink control channel (PUCCH) or a physical uplink shared channel (PUSCH) associated with uplink control information (UCI), where the configuration of resources may be received from a network entity, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. In some aspects, the UL component 198 may be further configured to transmit at least one of the UCI or the uplink transmission to the network entity.

In certain aspects, the base station 102 may include a UL component 199. In some aspects, the UL component 199 may be configured to transmit a configuration of resources for a PUCCH or a PUSCH associated with UCI, where the configuration of resources may be transmitted for a UE, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. In some aspects, the UL component 199 may be further configured to receive at least one of the UCI or the uplink transmission from the UE.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
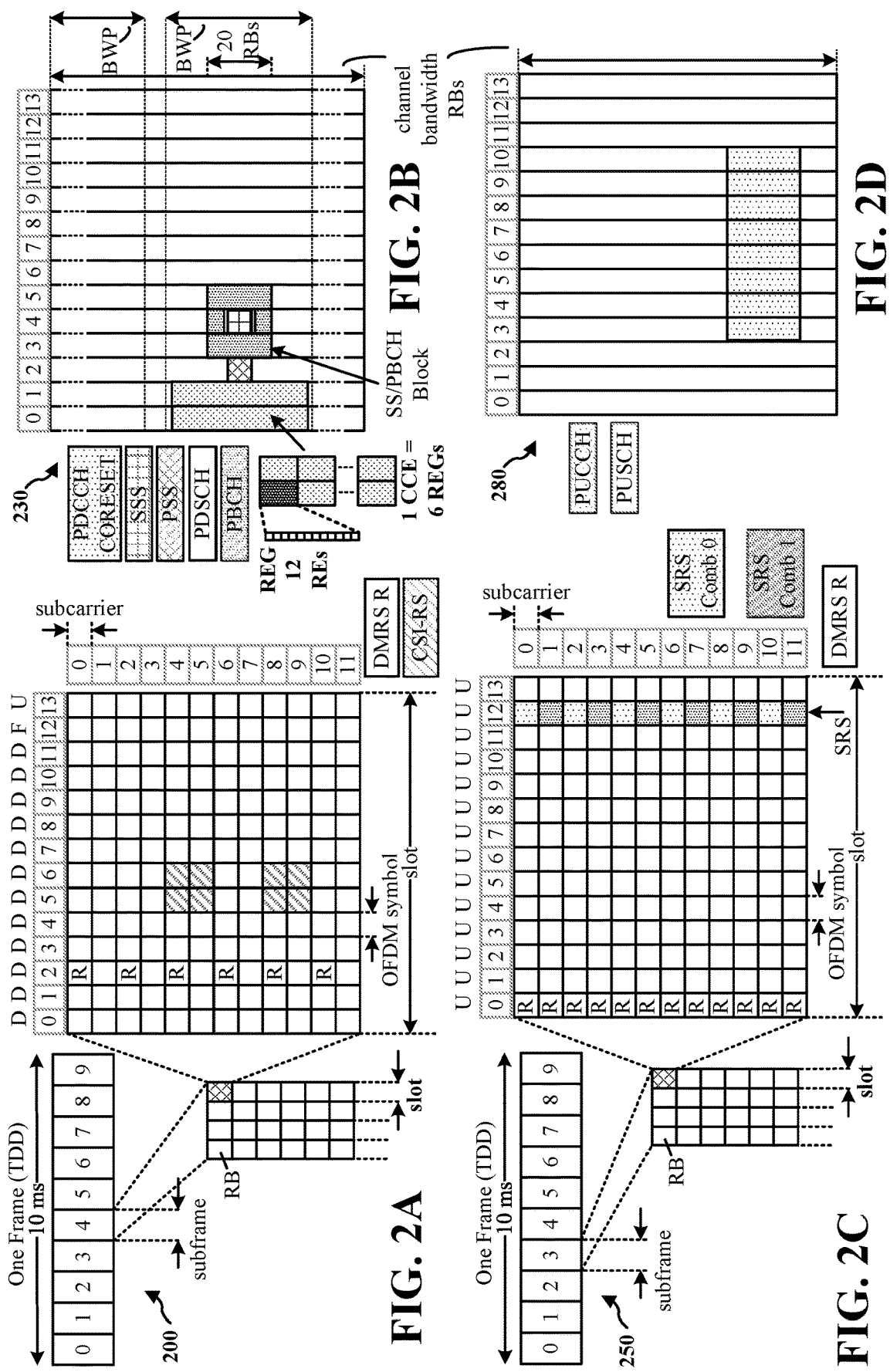
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
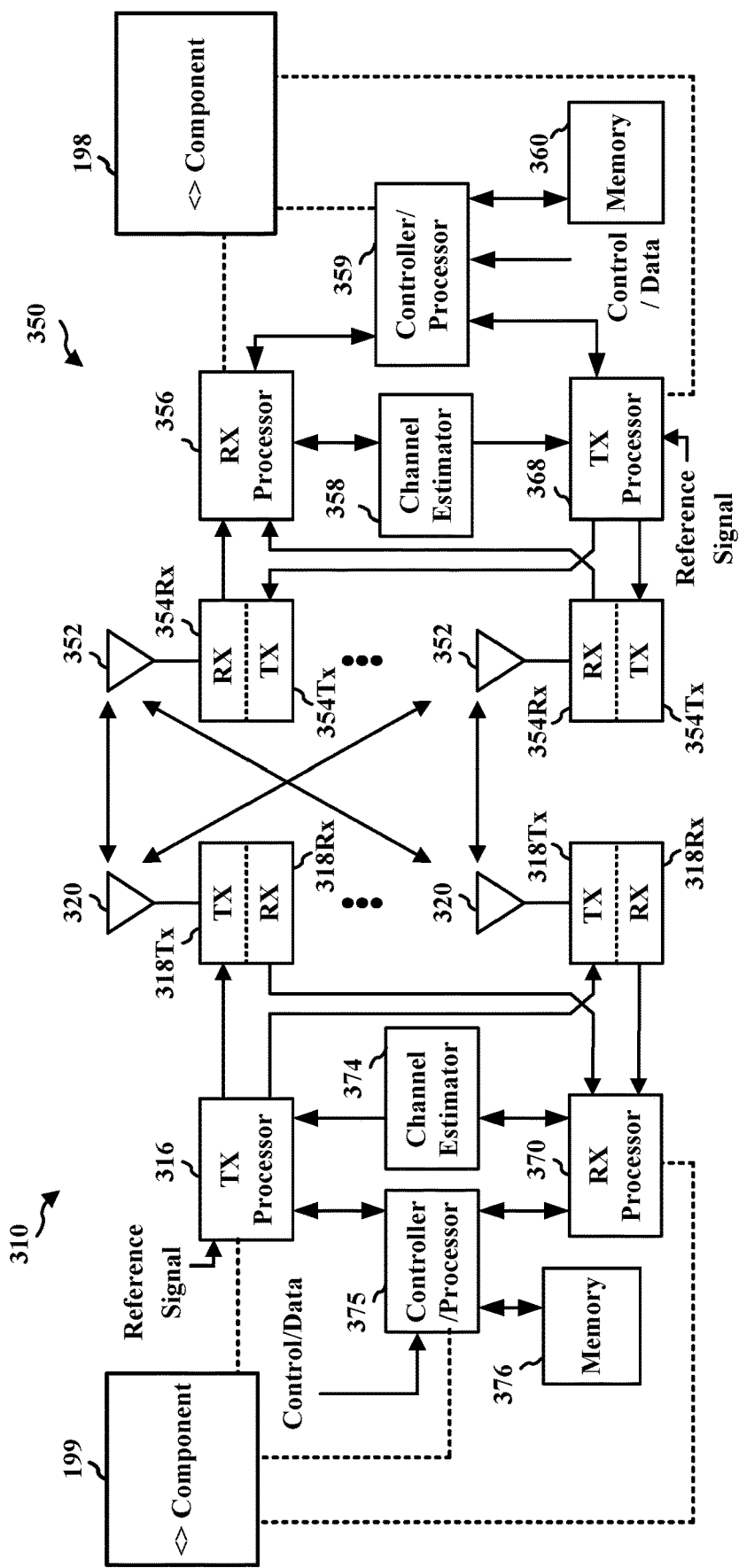
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with UL component 198 of FIG. 1.

At least one of the TX processor 316, the RX processor 370, and the controller/processor 375 may be configured to perform aspects in connection with UL component 199 of FIG. 1.

In some wireless communication systems, data to be transmitted may be generated by a variety of different applications, such as extended reality (XR) (which may include virtual reality, augmented reality, or mixed reality) applications or other applications. For some applications, such as XR applications, data traffic may be quasi-periodic and may be suitable for transmissions using a configured grant (CG). Compared to a dynamic grant (DG), a CG may reduce overhead of a scheduling DCI. In addition, with a CG, the UE may not go through the process of transmitting scheduling request (SR), monitoring PDCCH for UL grant, transmitting buffer status report, and then transmitting UL data. Therefore, using a CG may reduce latency and may allow UL packet transmission to meet a strict packet delay budget (PDB). In some wireless communication systems, the configuration of resource allocation of CG may be semi-static via radio resource control (RRC) signaling (CG type 1). For CG type 2, a resource allocation of CG may be transmitted via downlink control information (DCI). In either type of CG, the CG configuration may not be able to adapt to varying packet data sizes. Because the CG configuration may not be able to adapt to varying packet data sizes, the CG configuration may be configured based on a large data packet size to ensure the data could get transmitted. Such a CG configuration may cause the resource allocation to be over-allocated in instances where the data packet size is small. Some aspects provided herein may enable UEs to transmit over a portion of a CG (i.e., a subset of RBs) instead of transmitting over the entirety of the CG.

Figure 4:
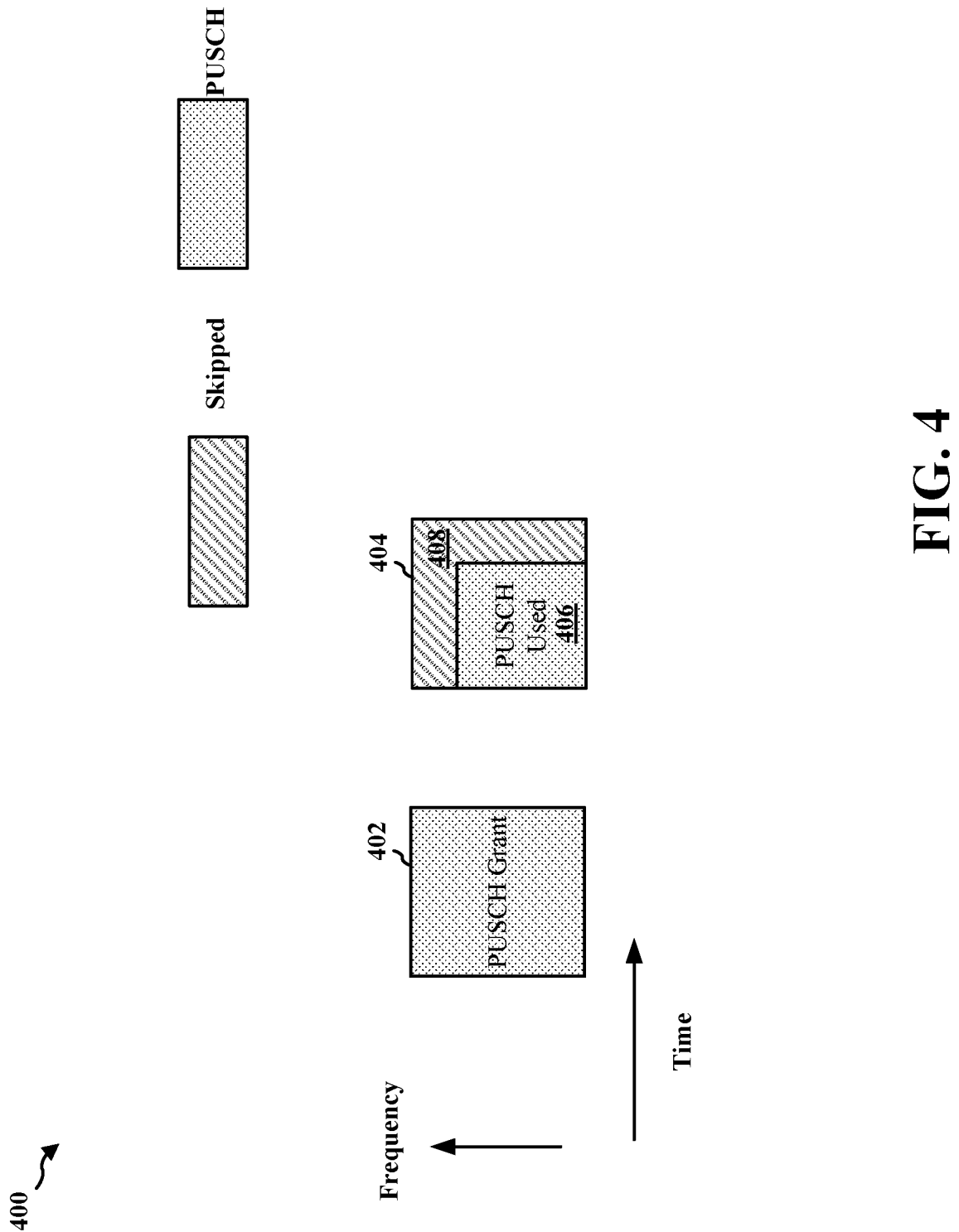
FIG. 4 is a diagram illustrating an example of not using entirety of scheduled PUSCH.

FIG. 4 is a diagram 400 illustrating an example of not using entirety of scheduled PUSCH. As illustrated in FIG. 4, a UE may be scheduled with a PUSCH grant 402 based on CG type 1 (e.g., via RRC signaling) or CG type 2 (e.g., via DCI). In instances where the UE does not have data to fully use the scheduled PUSCH grant 404, the UE may transmit over a portion 406 of the scheduled PUSCH grant 404 and skip transmission in a portion 408 of the scheduled PUSCH grant 404. In other words, the UE may transmit in a first subset of RBs (in portion 406) in the PUSCH grant 404 and refrain from transmitting in a second subset of RBs (in portion 408). Such a mechanism of transmitting in a first subset of RB s and refrain from transmitting in a second subset of RBs in a PUSCH grant may be referred to as "flexible uplink skipping (FUS)" or "partial uplink skipping."

Such a FUS mechanism may provide power saving gains (e.g., for XR applications) because the uplink PUSCH transmit power is a function of number of RBs. A transmission using more RBs may use more power. Enabling a UE to transmit using less RBs in some occasions may reduce uplink PUSCH transmit power and may in turn reduce power consumption at the UE.

Figure 5:
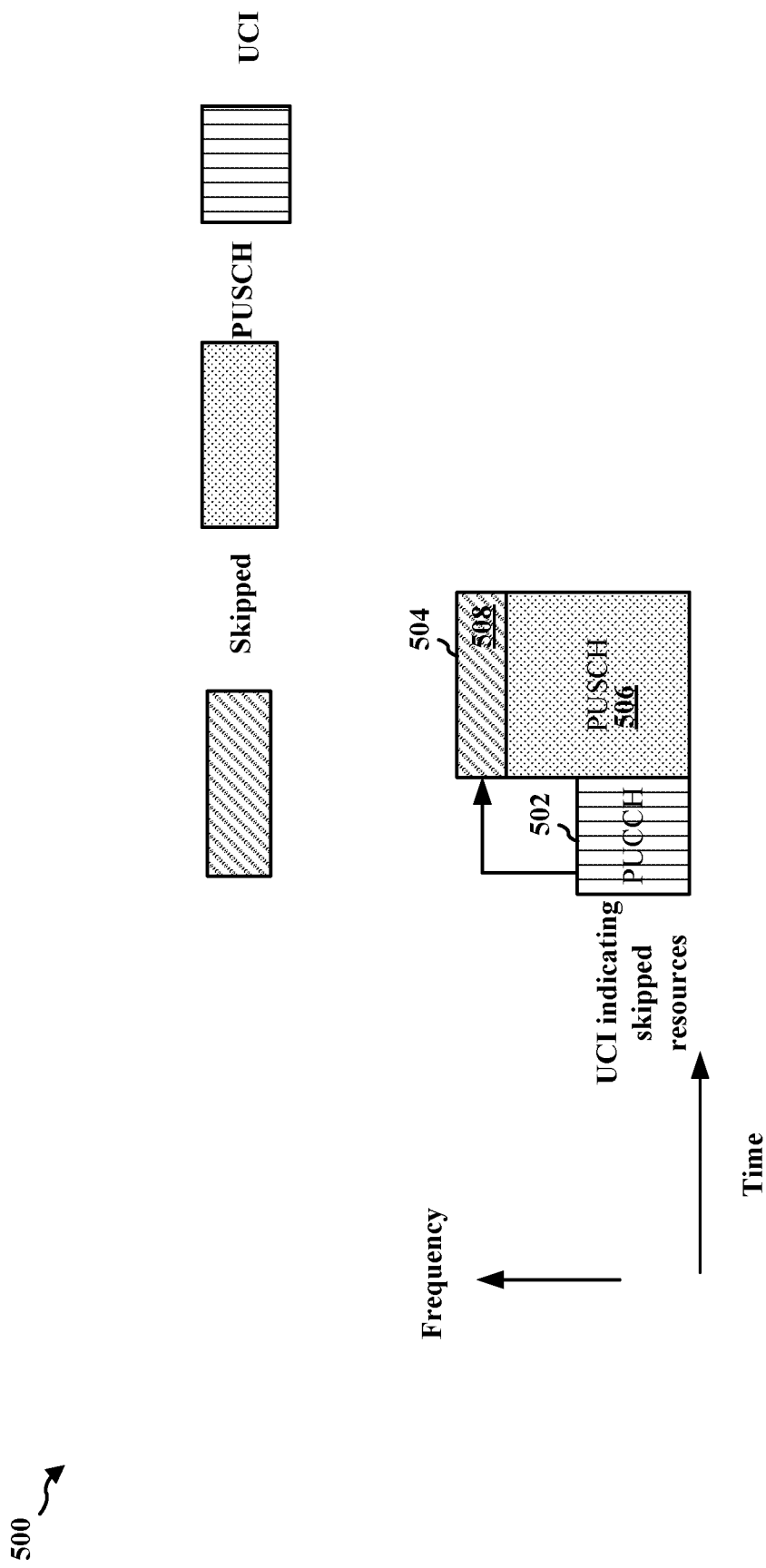
FIG. 5 is a diagram illustrating an example of a UCI indicating skipped resources in a PUSCH.

With FUS, the UE may inform the network of which resources in a scheduled UL grant would be utilized or skipped. A UE may indicate the utilized or skipped resources through control signaling, such as UCI. Such a UCI for indicating which resources in a scheduled UL grant would be utilized or skipped may be referred to as "UCI-FUS." In some aspects, an explicit indication in UCI-FUS may be sent over PUCCH which may be sent on same slot as the UL grant (e.g., PUSCH) or on different slots. FIG. 5 is a diagram 500 illustrating an example of a UCI indicating skipped resources in a PUSCH. As illustrated in FIG. 5, the UE may plan to transmit over a portion 506 of the scheduled PUSCH grant 504 and skip transmission in a portion 508 of the scheduled PUSCH grant 504. In other words, the UE may transmit in a first subset of RBs (in portion 506) in the PUSCH grant 504 and refrain from transmitting in a second subset of RBs (in portion 508). In order to indicate that the UE may transmit over the portion 506 of the scheduled PUSCH grant 504 and skip transmission in the portion 508 of the scheduled PUSCH grant 504, the UE may transmit UCI 502 to the network. Accordingly, a network entity (such as a base station) may decode the UCI 502 sent by the UE to determine how to decode the transmission. The UCI 502 may indicate the skipped resources (e.g., the portion 508) or the utilized resource (e.g., the portion 506). The UCI 502 may include the number of RBs the UE skipped/selected for PUSCH transmission, or indication of the time frequency resources used in UL such as: slot numbers, symbol numbers, RB numbers, RBG numbers, or the like. The UCI 502 may be used to adapt the transport block size for an upcoming instance.

Figure 6:
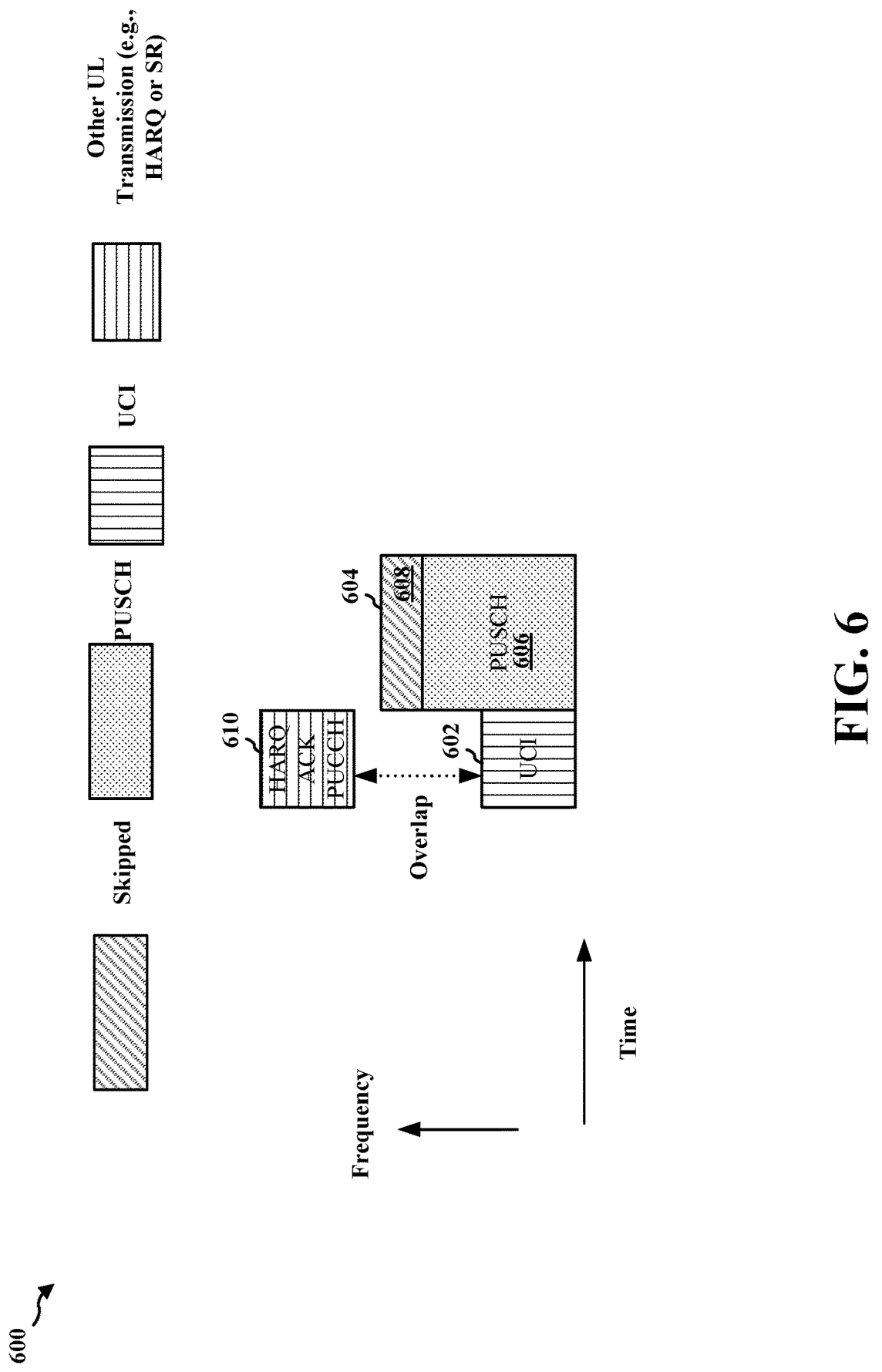
FIG. 6 is a diagram illustrating an example of a UCI overlapping with another UL transmission.

Because the UCI-FUS may be transmitted separately (e.g., on separate PUCCH resources) from the resources granted by the CG, the UCI-FUS may be overlapping with another UL transmission. FIG. 6 is a diagram 600 illustrating an example of a UCI overlapping with another UL transmission. As illustrated in FIG. 6, the UE may plan to transmit over a portion 606 of the scheduled PUSCH grant 604 and skip transmission in a portion 608 of the scheduled PUSCH grant 604. In other words, the UE may transmit in a first subset of RBs (in portion 606) in the PUSCH grant 604 and refrain from transmitting in a second subset of RBs (in portion 608). In order to indicate that the UE may transmit over the portion 606 of the scheduled PUSCH grant 604 and skip transmission in the portion 608 of the scheduled PUSCH grant 604, the UE may transmit UCI 602 to the network. The UCI 602 may be overlapping with a HARQ ACK 610. Aspects provided herein may resolve such overlap between UCI-FUS for indicating which resources in a scheduled UL grant would be utilized or skipped and other UL transmissions, resulting in effective power saving at the UE. In some aspects, intra multiplexing at the UE may accommodate for the dropping/multiplexing rules and the intra multiplexing may include UCI-FUS. In some aspects, if the UCI is dropped, the network may not receive the UCI and may assume full allocation (without resources skipped) or an allocation based on a default configuration (e.g., with default skipped resources configured for the CG). In some aspects, a two stage UCI may be utilized. In some aspects, the UE may also indicate a utilized lower MCS for lower power consumption in the UCI. As used herein, the term "drop" may refer to cancelling a transmission. As used herein, the term "skipped" may refer to an incident where a transmission not actually using a set of resources that may be scheduled for the transmission. As used herein, the term "CG configuration" may refer to a configuration configuring a set of resources for PUCCH or PUSCH in a set of periodical instances. As used herein, the term "cyclic shift" may refer to a bitwise operation of moving one or more bits at an end to a beginning and shifting other entries to later positions. As used herein, the term "circular buffer bits" may refer to buffer bits in a data structure that may use a single and fixed size buffer as if it were connected end-to-end.

Figure 7:
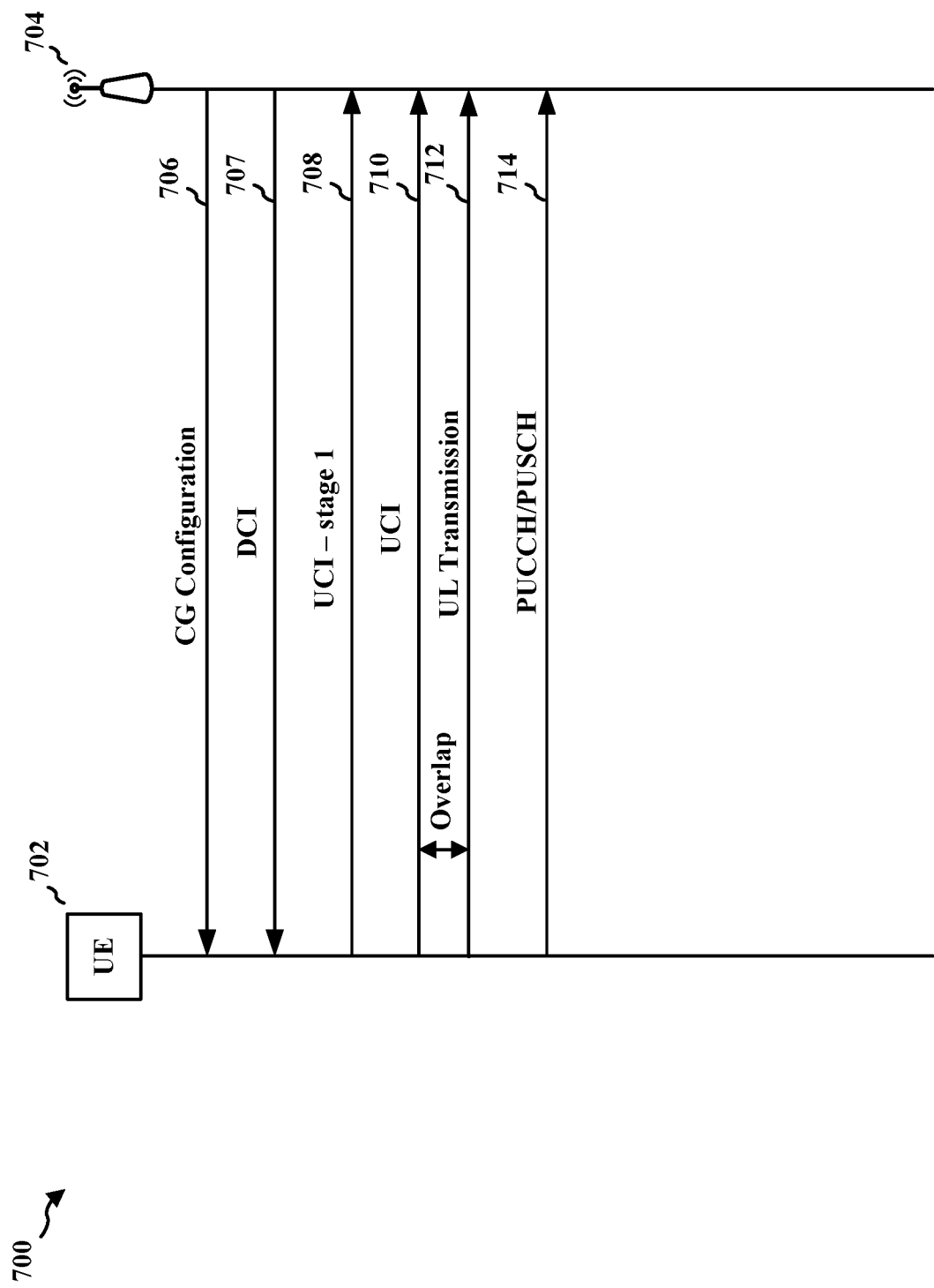
FIG. 7 is a diagram illustrating example communications between a network entity and a UE.

FIG. 7 is a diagram 700 illustrating example communications between a network entity 704 and a UE 702. In some aspects, the network entity 704 may be implemented as an aggregated base station, a disaggregated base station, an integrated access and backhaul (IAB) node, a relay node, a sidelink node, or the like. In some aspects, the network entity 704 may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

As illustrated in FIG. 7, the network entity 704 may transmit a CG configuration 706 to the UE 702. The CG configuration 706 may configure a set of resources for PUCCH or PUSCH transmissions in a set of instances (e.g., periodical instances) including the PUCCH/PUSCH 714. In some aspects, the UE 702 may transmit a UCI 710 to the network entity 704 to indicate that the UE may transmit in a first subset of resources in the scheduled PUCCH/PUSCH 714 and refrain from transmitting in a second subset of resources in the scheduled PUCCH/PUSCH 714. The UCI 710 may be a UCI FUS. In some aspects, the UCI 710 may overlap with another UL transmission 712. In some aspects, the UL transmission 712 may be a HARQ ACK/NACK, an SR, or other types of UL transmissions that is not part of the CG configuration 706.

In some aspects, the UCI 710 may be assigned with a priority. In some aspects, the UCI 710 may have a same priority as the PUCCH/PUSCH 714. In some aspects, the UCI 710 may have a priority that may be configured based on RRC or MAC control element (MAC-CE). In some aspects, the UCI 710 may have a priority that may be configured based on a DCI 707 from the network entity 704 to the UE 702. In some aspects, the network entity 704 may transmit a UL DCI (e.g., the DCI 707) before every PUCCH/PUSCH and indicate whether the UCI (e.g., 710) and the PUCCH/PUSCH (e.g., 714) are of same or different priority.

In some aspects, regardless of the priority assigned to the UCI 710, the UE may multiplex the UCI 710 with the UL transmission 712. In some aspects, the multiplex may be based on using a different cyclic shift with the UCI 710 and the UL transmission 712. In some aspects, the multiplex may be based on using different resources (e.g., time or frequency) (e.g., time division multiplex or frequency division multiplex), after encoding of the UCI 710 and the UL transmission 712. In some aspects, more resources may be associated with a higher priority one of the UCI 710 and the UL transmission 712.

In some aspects, one of the UCI 710 or the UL transmission 712 may be dropped by the UE 702 while the other one of the UCI 710 or the UL transmission 712 may be transmitted. For example, a lower priority one of the UCI 710 and the UL transmission 712 may be dropped. In some aspects, if the UCI 710 is dropped. The PUCCH/PUSCH 714 may also be dropped. In some aspects, to avoid dropping the PUCCH/PUSCH 714, the UE 702 may send a MAC PDU to be transmitted on the PUCCH/PUSCH 714 on a configured bandwidth (e.g., a configured bandwidth supporting a MAC PDU smaller than a MAC PDU the UE 702 may have originally generated for the subset of allocation in the UCI 710). In some aspects, if the configured bandwidth is smaller than a threshold (e.g., too small to carry the MAC PDU), the UE 702 may drop the PUCCH/PUSCH 714 or generate a new MAC PDU with a size based on the configured bandwidth. In some aspects, the UE 702 may generate the new MAC PDU with a size based on the configured bandwidth if the processing time from knowing about overlapping to the PUCCH/PUSCH 714 is enough for the UE 702. In some aspects, if the UCI 710 is dropped, the UE 702 may transmit the PUCCH/PUSCH 714 using the entire set of resources of the PUCCH/PUSCH 714 and may add one or more circular buffer bits in the second subset of resources in the PUCCH/PUSCH 714. In some aspects, whether the UE 702 drops the PUCCH/PUSCH 714, transmits the PUCCH/PUSCH 714 on a configured bandwidth, or transmits the PUCCH/PUSCH 714 using the entire set of resources of the PUCCH/PUSCH 714 and adds one or more circular buffer bits in the second subset of resources in the PUCCH/PUSCH 714 may be based on capability of the UE 702 to change the transmit power within the processing time (which may be time configured at which the UE 702 may use 1) full allocation; 2) configured allocation).

Figure 8:
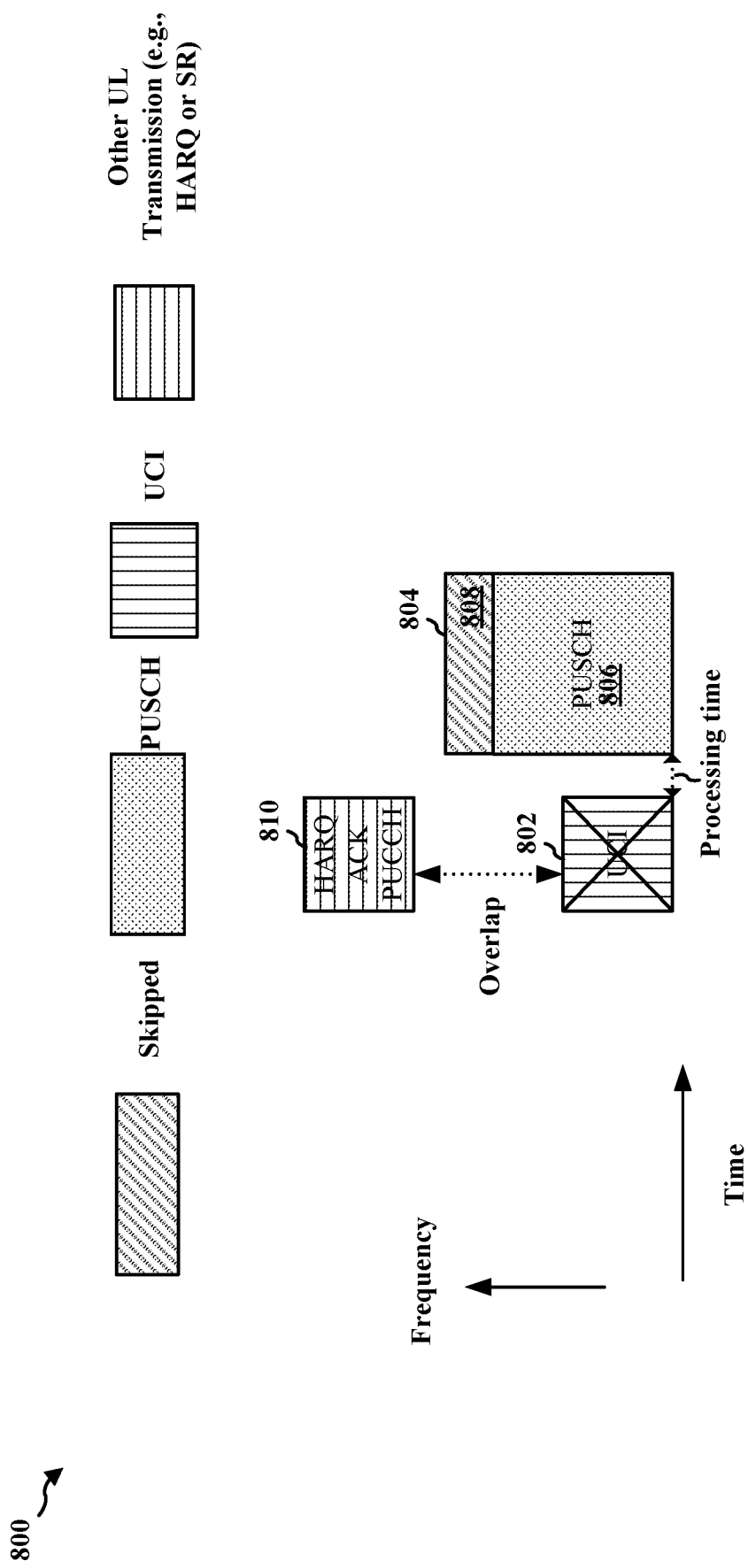
FIG. 8 is a diagram illustrating an example of dropping the UCI.

Referring to FIG. 8, FIG. 8 is a diagram 800 illustrating an example of dropping the UCI. As illustrated in FIG. 8, the UE may plan to transmit over a portion 806 of the scheduled PUSCH grant 804 and skip transmission in a portion 808 of the scheduled PUSCH grant 804. In other words, the UE may transmit in a first subset of RBs (in portion 806) in the PUSCH grant 804 and refrain from transmitting in a second subset of RBs (in portion 808). In order to indicate that the UE may transmit over the portion 806 of the scheduled PUSCH grant 804 and skip transmission in the portion 808 of the scheduled PUSCH grant 804, the UE may transmit UCI 802 to the network. The UCI 802 may be overlapping with a HARQ ACK 810. The UCI 802 may be dropped.

Figure 9:
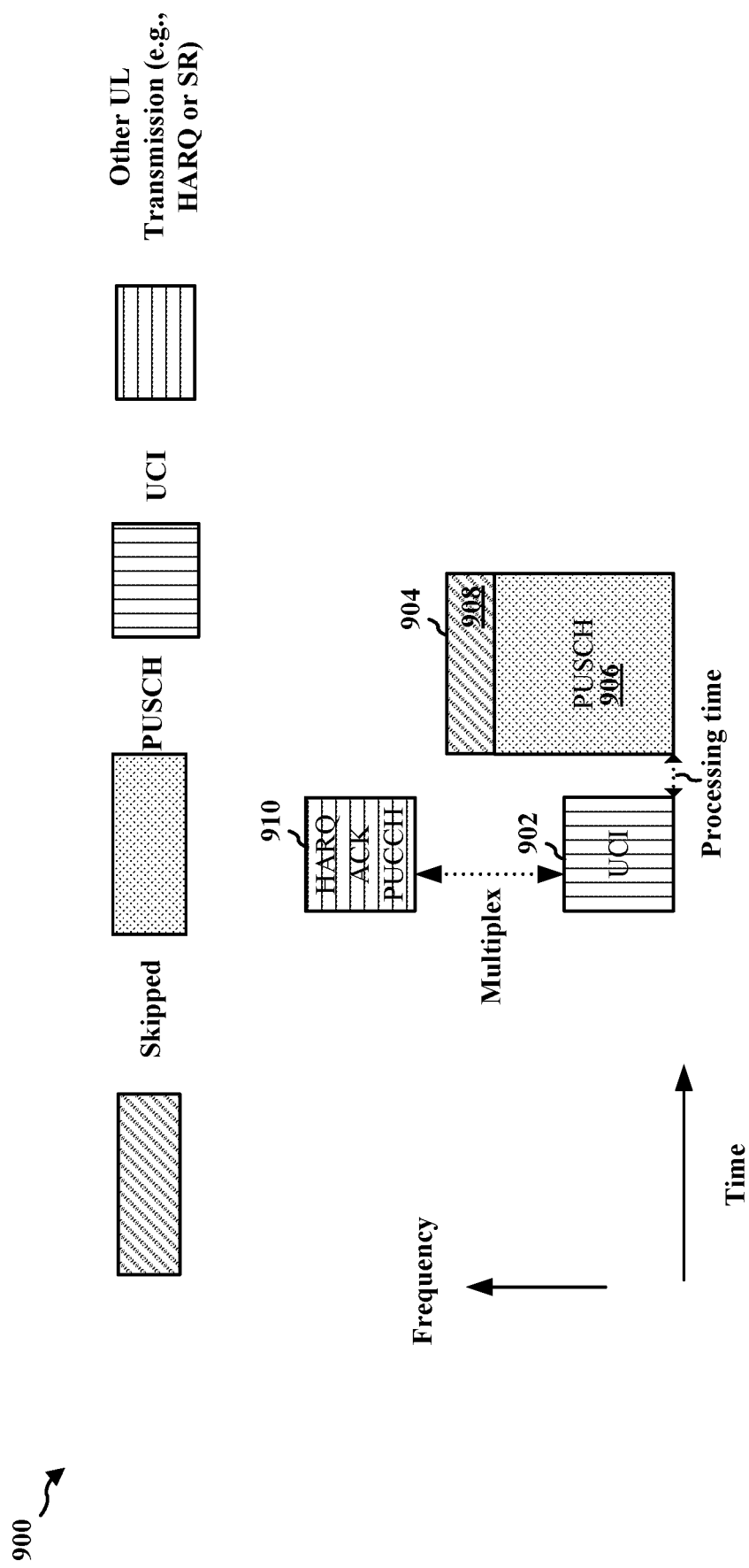
FIG. 9 is a diagram illustrating an example of multiplexing the UCI and the other UL transmission.

FIG. 9 is a diagram 900 illustrating an example of multiplexing the UCI and the other UL transmission. As illustrated in FIG. 9, the UE may plan to transmit over a portion 906 of the scheduled PUSCH grant 904 and skip transmission in a portion 908 of the scheduled PUSCH grant 904. In other words, the UE may transmit in a first subset of RBs (in portion 906) in the PUSCH grant 904 and refrain from transmitting in a second subset of RBs (in portion 908). In order to indicate that the UE may transmit over the portion 906 of the scheduled PUSCH grant 904 and skip transmission in the portion 908 of the scheduled PUSCH grant 904, the UE may transmit UCI 902 to the network. The UCI 902 may be overlapping with a HARQ ACK 910. The UCI 902 may be multiplexed with the HARQ ACK 910.

In some aspects, instead of associating each PUSCH with a UCI to indicate utilizing of full or part of the PUCCH/PUSCH, a UCI may indicate the full or partial use of multiple PUSCH (UCI indicates the utilization in part or full for a set of upcoming PUSCH signals), or single UCI may be applicable on all PUSCH (e.g., single UCI indicates using portion of PUSCH across all X upcoming PUSCH, X being a positive integer). Referring back to FIG. 7, in some aspects, the UCI-FUS may further include a first stage UCI 708 and the UCI 710 may be a second stage UCI. In some aspects, the first stage UCI 708 may be a single RB carrying one bit (e.g., in PUCCH format 0) and may indicate whether the UE 702 may transmit in all or a subset of resources in the PUCCH/PUSCH 714. In some aspects, the first stage UCI 708 may indicate whether the UE 702 may use the allocation associated with the PUCCH/PUSCH 714 in full or not. In some aspects, the UCI 710 may be a second stage UCI that may be associated with the PUCCH/PUSCH 714 and indicate the first subset of resources where the UE 702 may transmit in or the second subset of resources where the UE 702 may skip. In some aspects, the UCI 710 may be transmitted based on the first stage UCI 708 indicating that the UE 702 may transmit in a subset of resources in the PUCCH/PUSCH 714 (e.g., not using allocation in full). In some aspects, the second stage UCI may be multiplexed with the PUCCH/PUSCH 714 after encoding and different RBs/REs may be used for the second stage UCI and the PUCCH/PUSCH 714, which may allow the network entity 704 to determine the second stage UCI before decoding the PUCCH/PUSCH 714 and determine how to decode the PUCCH/PUSCH 714 based on the second stage UCI.

Figure 10:
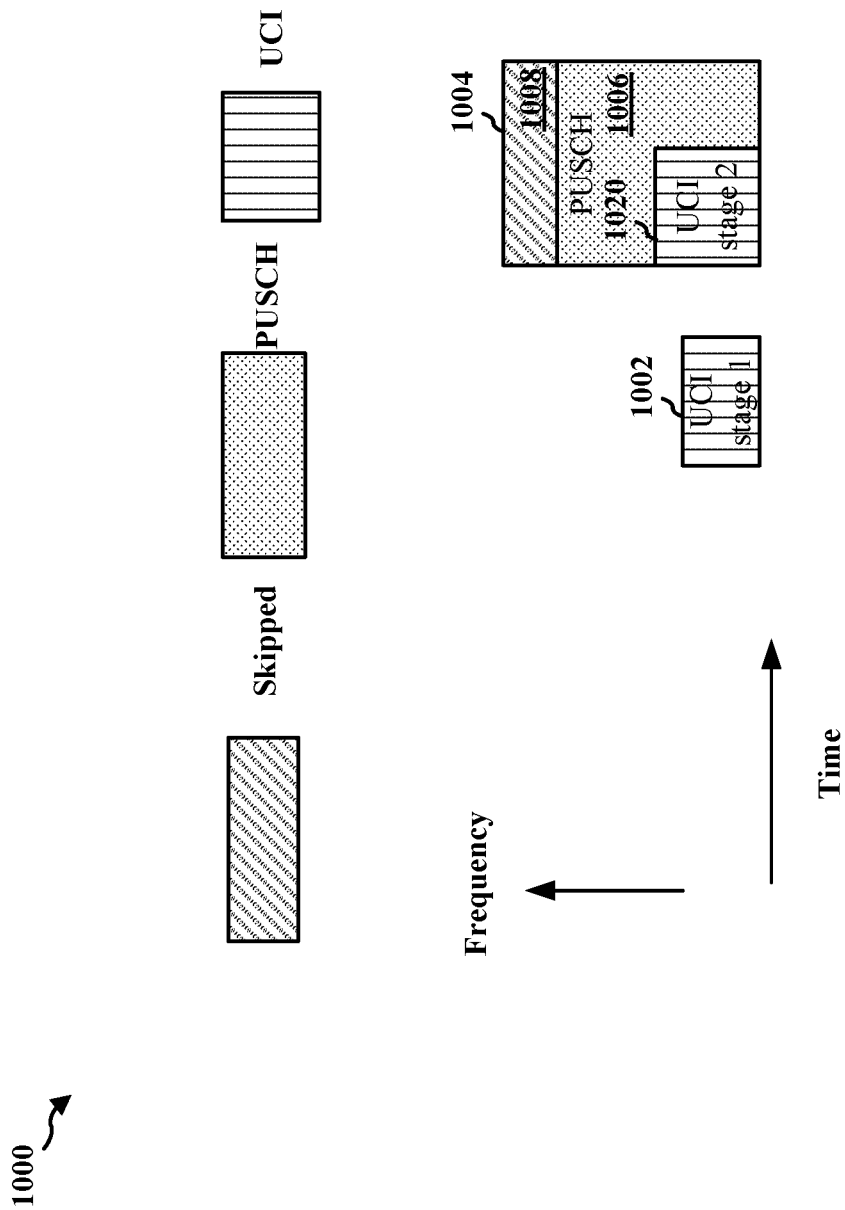
FIG. 10 is a diagram illustrating an example of two stage UCI.

FIG. 10 is a diagram 1000 illustrating an example of two stage UCI. As illustrated in FIG. 10, the UE may plan to transmit over a portion 1006 of the scheduled PUSCH grant 1004 and skip transmission in a portion 1008 of the scheduled PUSCH grant 1004. In other words, the UE may transmit in a first subset of RBs (in portion 1006) in the PUSCH grant 1004 and refrain from transmitting in a second subset of RBs (in portion 1008). In order to indicate that the UE may not use all of the PUSCH grant 1004, the UE may transmit UCI 1002 to the network. To indicate the portion 1006 or the portion 1008, the UE may transmit UCI 1020 to the network. The UCI 1020 may be multiplexed with the PUSCH.

In some aspects, the UCI 710 may be multiplexed with the PUCCH/PUSCH 714 so that an overlap with another UL transmission may not occur. In such aspects, the UCI 710 may be transmitted on confined contiguous PUSCH resources. The resources may be reserved for the UCI 710 and may have their own DM-RS sequence to avoid ambiguity in channel estimation when a portion of the PUCCH/PUSCH 714 is skipped. In some aspects, the UCI 710 may be multiplexed with the PUCCH/PUSCH 714 after encoding and different RBs/REs may be used, which may allow the network entity 704 to determine the UCI 710 before decoding the PUCCH/PUSCH 714 and determine how to decode the PUCCH/PUSCH 714 based on the UCI 710. In some aspects, the UCI 710 may be multiplexed with the PUCCH/PUSCH 714 if the PUCCH/PUSCH 714 is based on cyclic prefix OFDM (CP-OFDM). In some aspects, the UCI 710 may not be multiplexed with the PUCCH/PUSCH 714 if the PUCCH/PUSCH 714 is based on discrete Fourier transform spread OFDM (DFT-s-OFDM).

Figure 11:
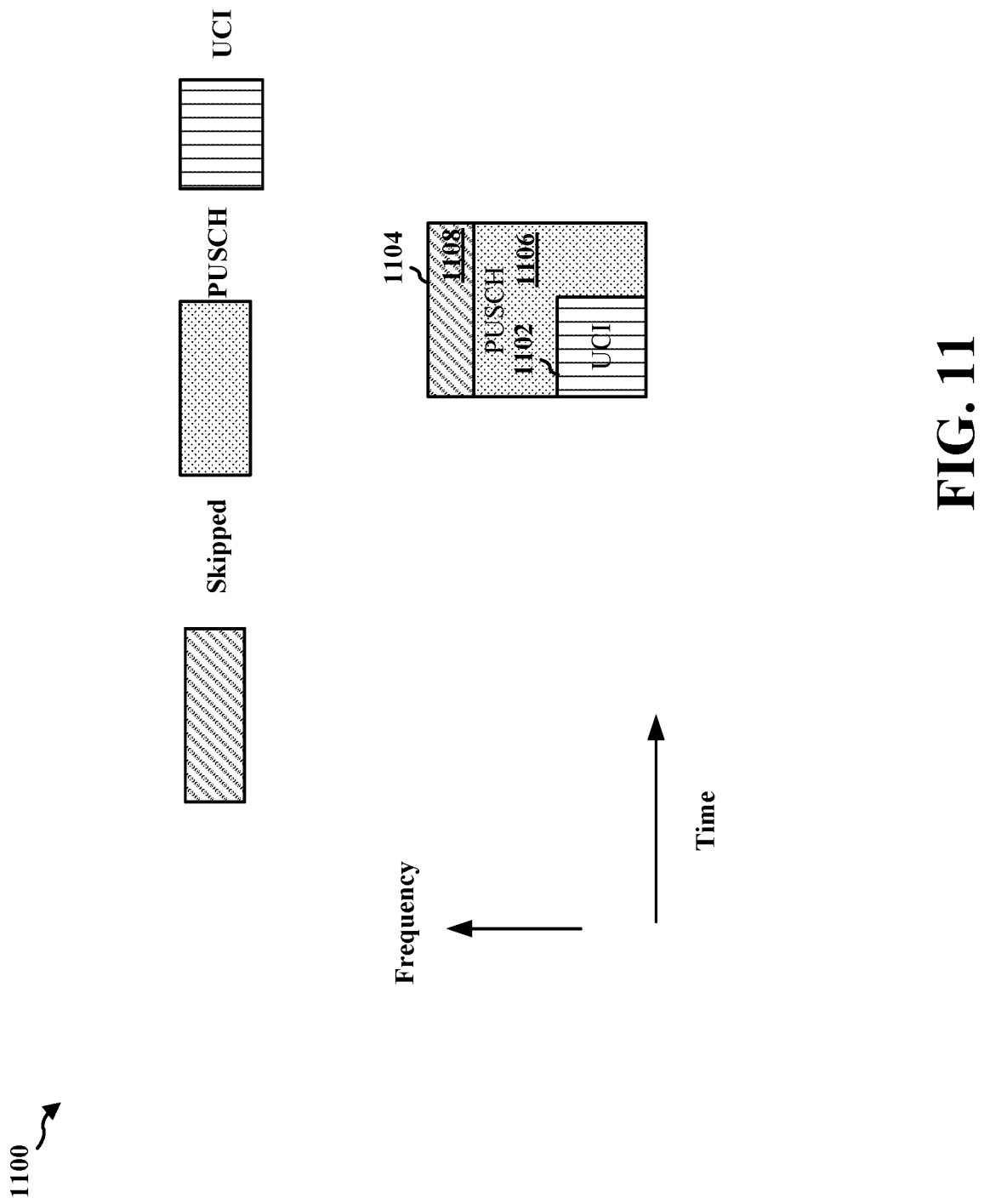
FIG. 11 is a diagram illustrating an example of multiplexing the UCI with the PUSCH transmission.

FIG. 11 is a diagram 1100 illustrating an example of multiplexing the UCI with the PUSCH transmission. As illustrated in FIG. 11, the UE may plan to transmit over a portion 1106 of the scheduled PUSCH grant 1104 and skip transmission in a portion 1108 of the scheduled PUSCH grant 1104. In other words, the UE may transmit in a first subset of RBs (in portion 1106) in the PUSCH grant 1104 and refrain from transmitting in a second subset of RBs (in portion 1108). In order to indicate that the UE may transmit over the portion 1106 of the scheduled PUSCH grant 1104 and skip transmission in the portion 1108 of the scheduled PUSCH grant 1104, the UE may transmit UCI 1102 to the network. The UCI 1102 may be multiplexed with the PUSCH grant 1104.

In some aspects, a first cell may use the UCI 710 for a second cell. For example, the first cell may include PUCCH resources for transmission of PUCCH/PUSCH 714. The UCI 710 may collide with other transmission (e.g., UCI-ACK/NACK of higher priority). In some aspects, processing time may be defined between the UCI-FUS on first cell and the PUCCH/PUSCH 714 on the second cell.

Figure 12:
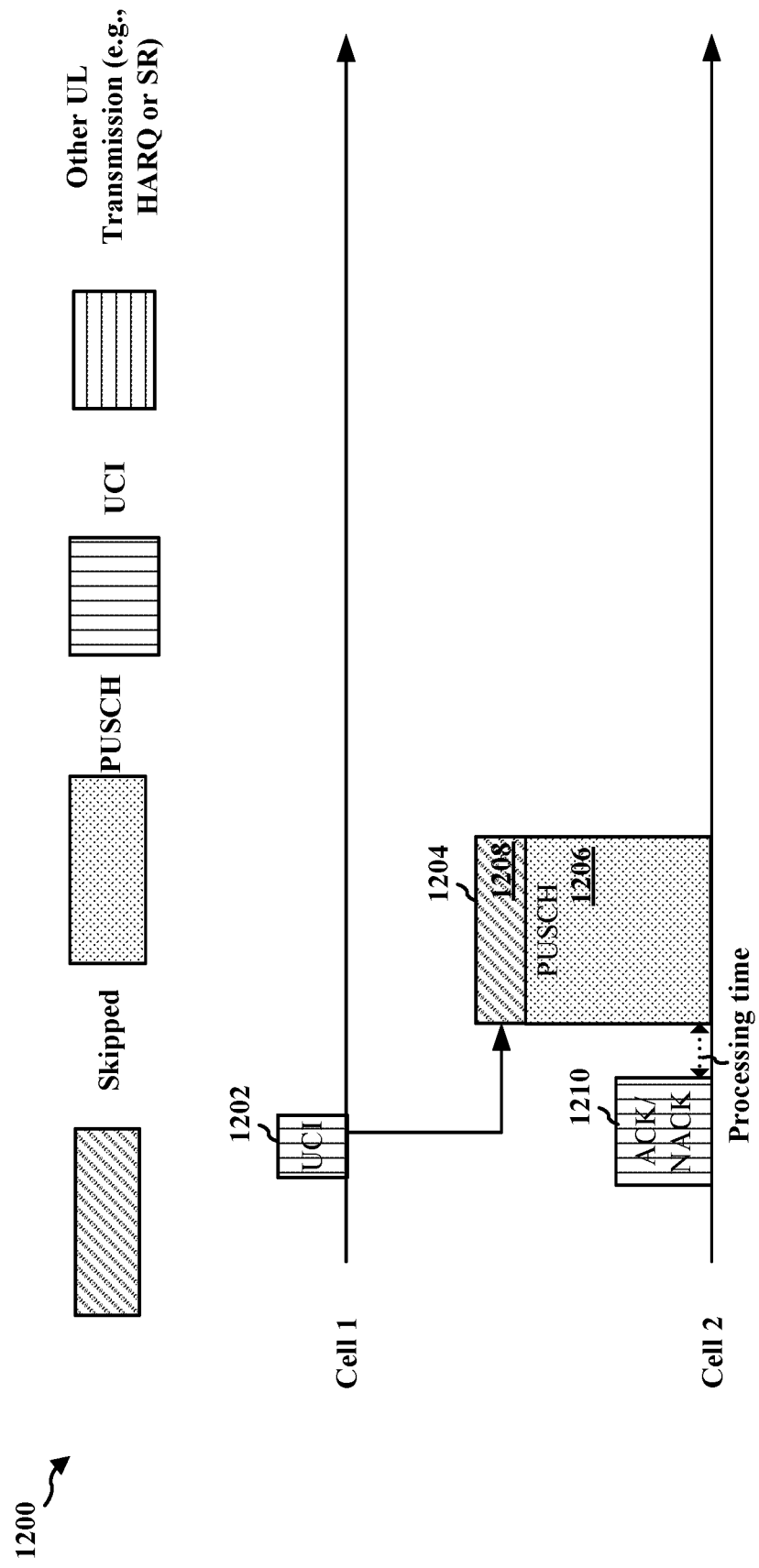
FIG. 12 is a diagram illustrating an example of cross carrier indication.

FIG. 12 is a diagram 1200 illustrating an example of cross carrier indication. As illustrated in FIG. 12, the UCI 1202 may be on a first cell and may indicate that the UE transmit over the portion 1206 of the scheduled PUSCH grant 1204 on a second cell and skip transmission in the portion 1208 of the scheduled PUSCH grant 1204. The UCI 1202 may be overlapping with ACK/NACK 1210 on the second cell.

Figure 13:
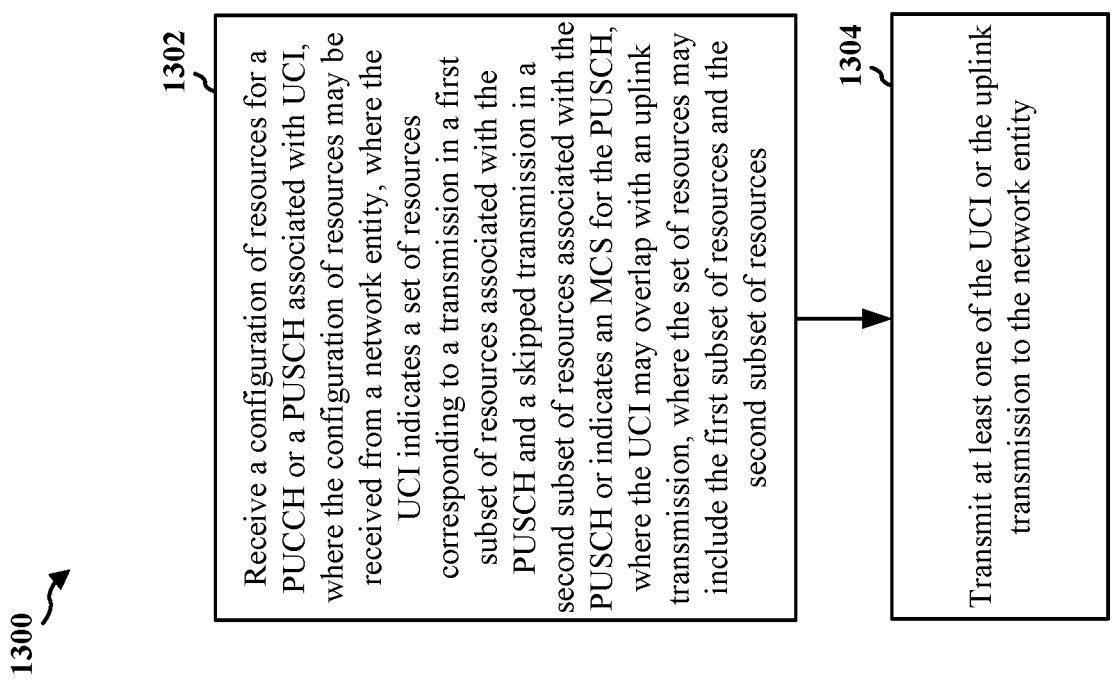
FIG. 13 is a flowchart of a method of wireless communication.

FIG. 13 is a flowchart 1300 of a method of wireless communication. The method may be performed by a UE (e.g., the UE 104, the UE 702; the apparatus 1704).

At 1302, the UE may receive a configuration of resources for a PUCCH or a PUSCH associated with UCI, where the configuration of resources may be received from a network entity, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. For example, the UE 702 may receive a configuration of resources (e.g., 706) for a PUCCH or a PUSCH (e.g., 714) associated with UCI (e.g., 710), where the configuration of resources may be received from a network entity, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission (e.g., 712), where the set of resources may include the first subset of resources and the second subset of resources. In some aspects, 1302 may be performed by UL component 198.

At 1304, the UE may transmit at least one of the UCI or the uplink transmission to the network entity. For example, the UE 702 may transmit at least one of the UCI 710 or the uplink transmission 712 to the network entity 704. In some aspects, 1304 may be performed by UL component 198.

Figure 14:
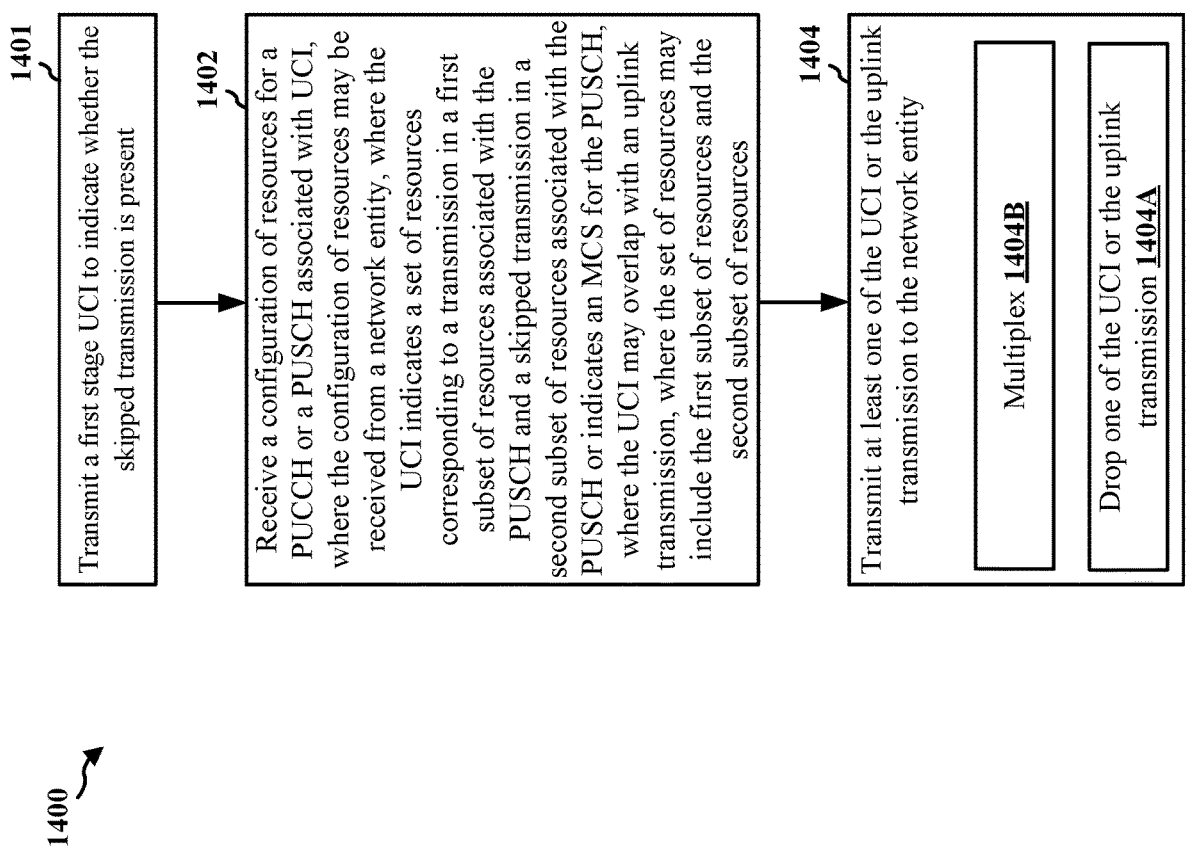
FIG. 14 is a flowchart of a method of wireless communication.

FIG. 14 is a flowchart 1400 of a method of wireless communication. The method may be performed by a UE (e.g., the UE 104, the UE 702; the apparatus 1704).

At 1401, the UE may transmit a first stage UCI to indicate whether the skipped transmission may be present. For example, the UE 702 may transmit a first stage UCI (e.g., UCI 708) to indicate whether the skipped transmission may be present. In some aspects, 1401 may be performed by UL component 198.

At 1402, the UE may receive a configuration of resources for a PUCCH or a PUSCH associated with UCI, where the configuration of resources may be received from a network entity, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. For example, the UE 702 may receive a configuration of resources (e.g., 706) for a PUCCH or a PUSCH (e.g., 714) associated with UCI (e.g., 710), where the configuration of resources may be received from a network entity, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission (e.g., 712), where the set of resources may include the first subset of resources and the second subset of resources. For example, the UCI may overlap with the uplink transmission due to being scheduled to overlap with the uplink transmission or the UE may transmit a higher priority uplink transmission (such as high priority HARQ ACK/NACK) that may happen to overlap with the UCI. In some aspects, 1402 may be performed by UL component 198. In some aspects, the UCI may be associated with a priority, and where the priority may be based on one of: the PUSCH, RRC signaling, a MAC-CE, or DCI associated with the UCI. In some aspects, the UCI may be a second stage UCI. In some aspects, the second stage UCI may be multiplexed with the PUSCH or the PUCCH in the first subset of resources after encoding the PUSCH or the PUCCH. In some aspects, the UCI may be multiplexed with the PUSCH or the PUCCH in the first subset of resources after encoding the PUSCH or the PUCCH. In some aspects, the UCI may be associated with a first cell and the PUSCH or the PUCCH may be associated with a second cell.

At 1404, the UE may transmit at least one of the UCI or the uplink transmission to the network entity. For example, the UE 702 may transmit at least one of the UCI 710 or the uplink transmission 712 to the network entity 704. In some aspects, 1404 may be performed by UL component 198.

In some aspects, transmitting at least one of the UCI or the uplink transmission to the network entity may include transmit a first one of the UCI and the uplink transmission based on the priority or drop a second one of the uplink transmission or the UCI based on the priority (e.g., at 1404A). For example, the UE 702 may transmit a first one of the UCI 710 and the uplink transmission 712 based on the priority or drop a second one of the uplink transmission 712 or the UCI 710 based on the priority. In some aspects, 1404A may be performed by UL component 198. In some aspects, the second one may be the UCI, and the UE may drop the PUSCH or the PUCCH. In some aspects, the UE may transmit a MAC PDU associated with the PUSCH or the PUCCH in a bandwidth smaller than the first subset of resources. In some aspects, the UE may transmit the PUSCH or the PUCCH in the first subset of resources and the second subset of resources with one or more circulate buffer bits in the second subset of resources.

In some aspects, the UE may multiplex the UCI and the uplink transmission (e.g., at 1404B). For example, the UE 702 may multiplex the UCI 710 and the uplink transmission 712. In some aspects, the UCI and the uplink transmission may be multiplexed based on the UCI being associated with a first cyclic shift and the uplink transmission being associated with a second cyclic shift. In some aspects, the UCI and the uplink transmission may be multiplexed based on frequency division multiplexing or time division multiplexing. In some aspects, 1404B may be performed by UL component 199.

Figure 15:
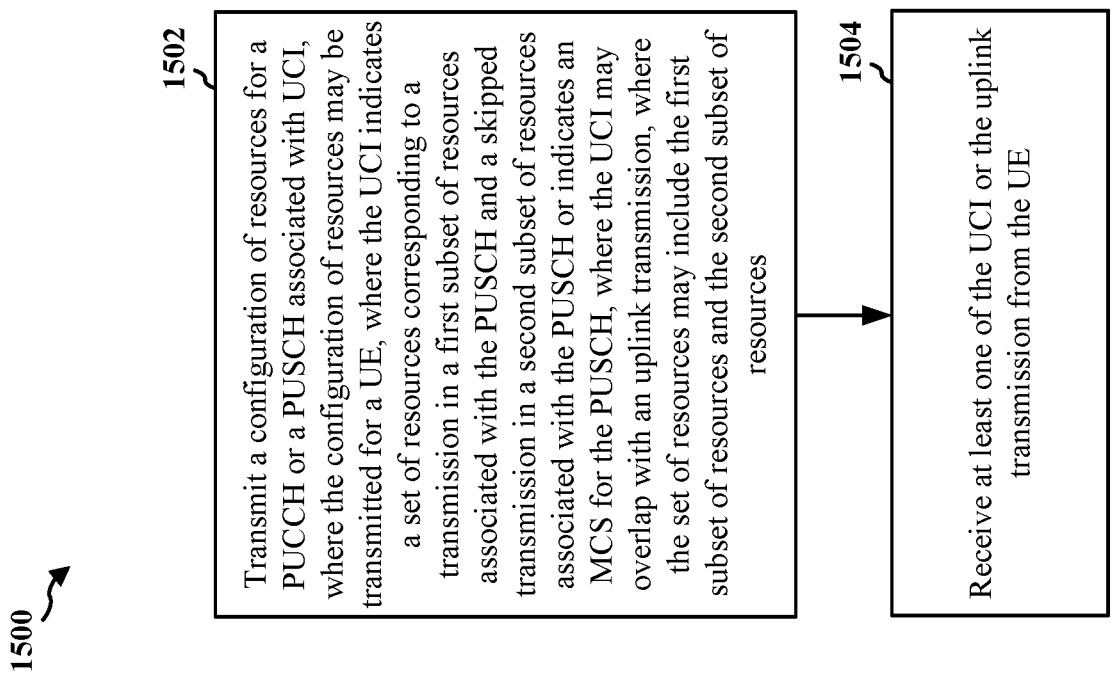
FIG. 15 is a flowchart of a method of wireless communication.

FIG. 15 is a flowchart 1500 of a method of wireless communication. The method may be performed by a network entity (e.g., the base station 102, the network entity 704, the network entity 1702, the network entity 1802).

At 1502, the network entity may transmit a configuration of resources for a PUCCH or a PUSCH associated with UCI, where the configuration of resources may be transmitted for a UE, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. For example, the network entity 704 may transmit a configuration of resources (e.g., 706) for a PUCCH or a PUSCH (e.g., 714) associated with UCI (e.g., 710), where the configuration of resources may be transmitted for a UE 702, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission (e.g., 712), where the set of resources may include the first subset of resources and the second subset of resources. In some aspects, 1502 may be performed by UL component 199.

At 1504, the network entity may receive at least one of the UCI or the uplink transmission from the UE. For example, the network entity 704 may receive at least one of the UCI 710 or the uplink transmission 712 from the UE 702. In some aspects, 1504 may be performed by UL component 199.

Figure 16:
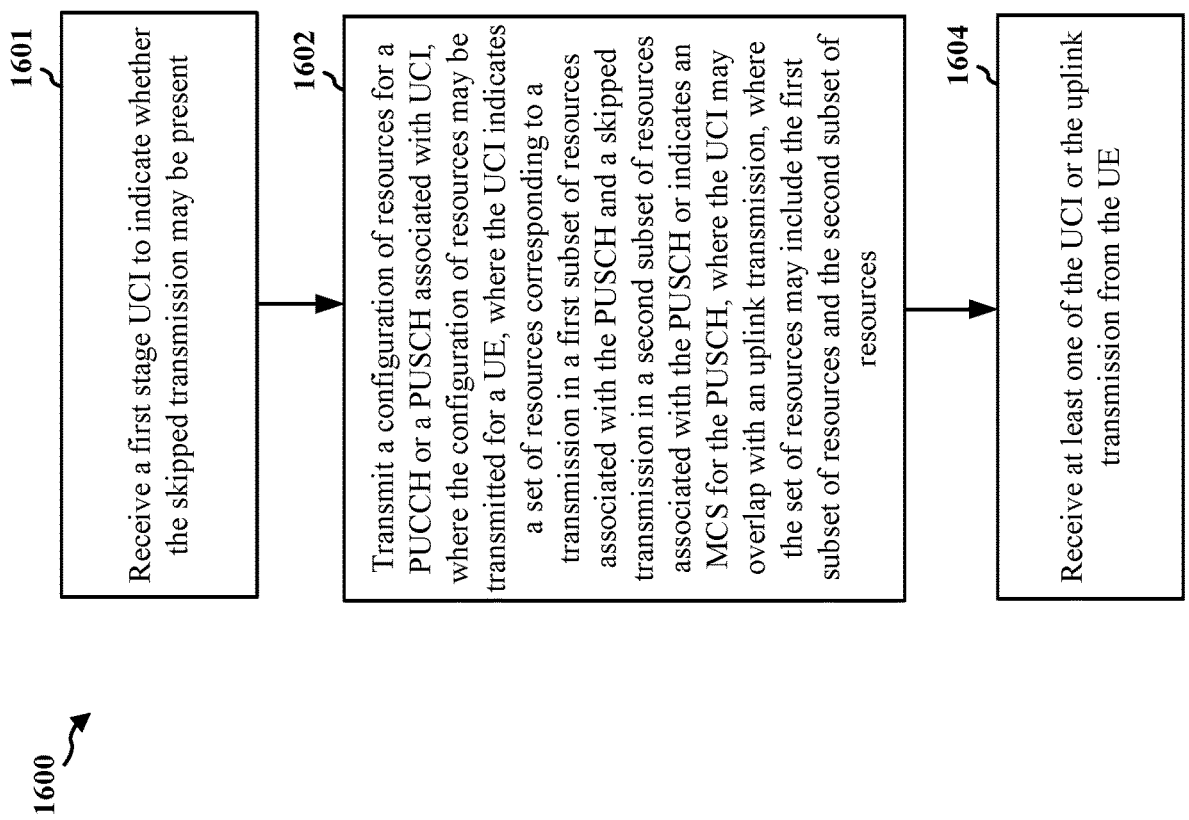
FIG. 16 is a flowchart of a method of wireless communication.

FIG. 16 is a flowchart 1600 of a method of wireless communication. The method may be performed by a network entity (e.g., the base station 102, the network entity 704, the network entity 1702, the network entity 1802).

At 1601, the network entity may receive a first stage UCI to indicate whether the skipped transmission may be present. For example, the network entity 704 may receive a first stage UCI (e.g., UCI 708) to indicate whether the skipped transmission may be present. In some aspects, 1601 may be performed by UL component 199.

At 1602, the network entity may transmit a configuration of resources for a PUCCH or a PUSCH associated with UCI, where the configuration of resources may be transmitted for a UE, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. For example, the network entity 704 may transmit a configuration of resources (e.g., 706) for a PUCCH or a PUSCH (e.g., 714) associated with UCI (e.g., 710), where the configuration of resources may be transmitted for a UE 702, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission (e.g., 712), where the set of resources may include the first subset of resources and the second subset of resources. For example, the UCI may overlap with the uplink transmission due to being scheduled to overlap with the uplink transmission or the UE may transmit a higher priority uplink transmission (such as high priority HARQ ACK/NACK) that may happen to overlap with the UCI. In some aspects, 1602 may be performed by UL component 199. In some aspects, the UCI may be associated with a priority, and where the priority may be based on one of: the PUSCH, RRC signaling, a MAC-CE, or DCI associated with the UCI. In some aspects, the UCI may be associated with a priority, and where the priority may be based on one of: the PUSCH, RRC signaling, a MAC-CE, or DCI associated with the UCI. In some aspects, the UCI may be a second stage UCI. In some aspects, the second stage UCI may be multiplexed with the PUSCH or the PUCCH in the first subset of resources after encoding the PUSCH or the PUCCH. In some aspects, the UCI may be multiplexed with the PUSCH or the PUCCH in the first subset of resources after encoding the PUSCH or the PUCCH. In some aspects, the UCI may be associated with a first cell and the PUSCH or the PUCCH may be associated with a second cell.

At 1604, the network entity may receive at least one of the UCI or the uplink transmission from the UE. For example, the network entity 704 may receive at least one of the UCI 710 or the uplink transmission 712 from the UE 702. In some aspects, 1604 may be performed by UL component 199. In some aspects, a first one of the UCI or the uplink transmission may be received based on the priority and a second one of the uplink transmission or the UCI may be not received. In some aspects, the second one may be the UCI, and where the PUSCH or the PUCCH may be dropped. In some aspects, the second one may be the UCI, and as part of 1604, the network entity may receive a MAC PDU associated with the PUSCH or the PUCCH in a bandwidth smaller than the first subset of resources. In some aspects, as part of 1604, the network entity may receive the PUSCH or the PUCCH in the first subset of resources and the second subset of resources with one or more circulate buffer bits in the second subset of resources. In some aspects, the UCI and the uplink transmission may be multiplexed. In some aspects, the UCI and the uplink transmission may be multiplexed based on the UCI being associated with a first cyclic shift and the uplink transmission being associated with a second cyclic shift. In some aspects, the UCI and the uplink transmission may be multiplexed based on frequency division multiplexing or time division multiplexing.

Figure 17:
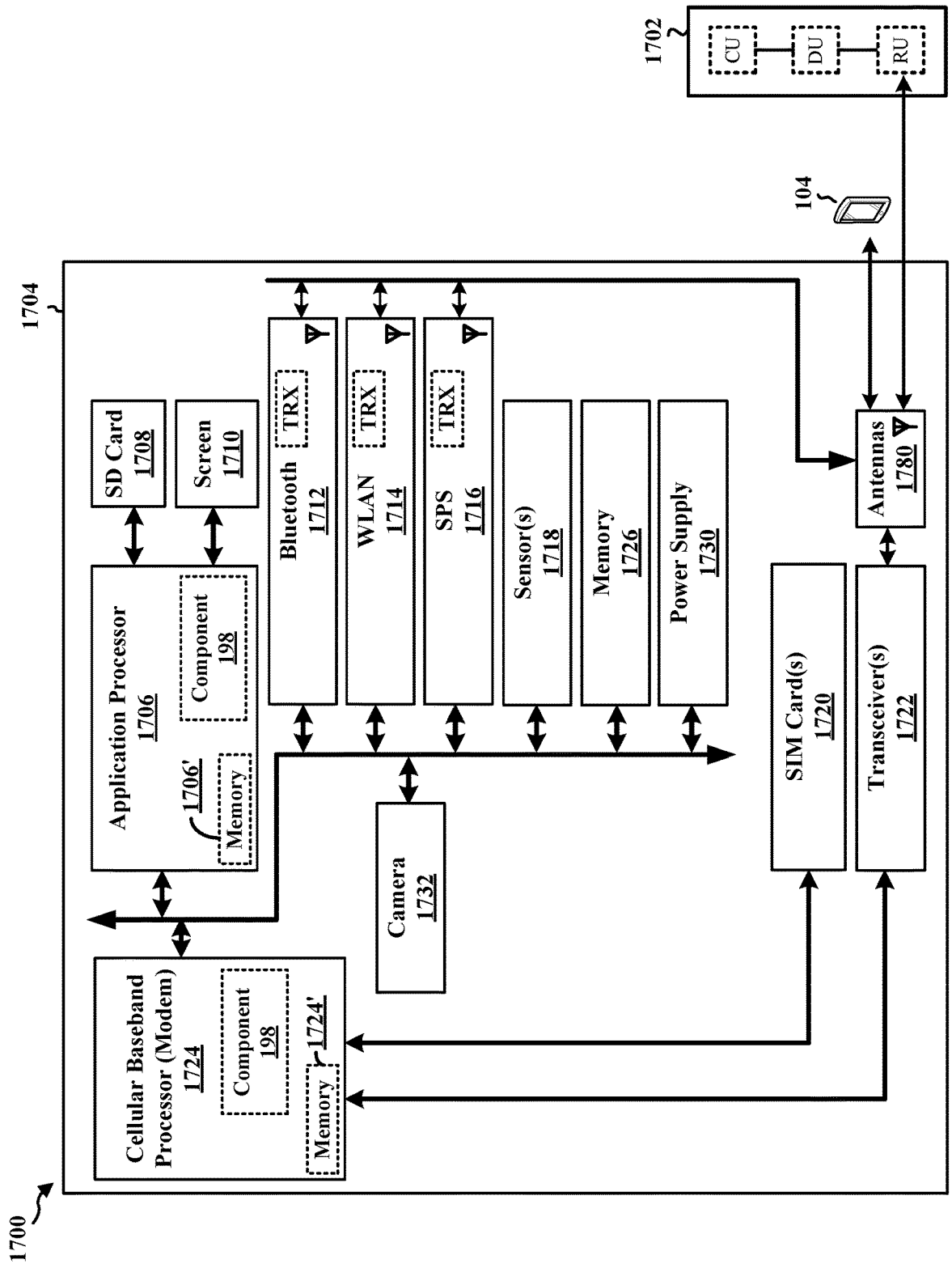
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, a satellite system module 1716 (e.g., GNSS module), one or more sensor modules 1718 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the satellite system module 1716 may include an on-chip transceiver (TRX)/receiver (RX). The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described herein. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed herein, the UL component 198 may be configured to receive a configuration of resources for a physical uplink control channel (PUCCH) or a physical uplink shared channel (PUSCH) associated with uplink control information (UCI), where the configuration of resources may be received from a network entity, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. In some aspects, the UL component 198 may be further configured to transmit at least one of the UCI or the uplink transmission to the network entity. The UL component 198 may be within the cellular baseband processor 1724, the application processor 1706, or both the cellular baseband processor 1724 and the application processor 1706. The UL component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for receiving a configuration of resources for a PUCCH or a PUSCH associated with UCI, where the configuration of resources may be received from a network entity, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. In some aspects, the apparatus 1704 may further include means for transmitting at least one of the UCI or the uplink transmission to the network entity. In some aspects, the apparatus 1704 may further include means for transmitting a first one of the UCI or the uplink transmission based on the priority. In some aspects, the apparatus 1704 may further include means for dropping a second one of the uplink transmission or the UCI based on the priority. In some aspects, the apparatus 1704 may further include means for dropping the PUSCH or the PUCCH. In some aspects, the apparatus 1704 may further include means for transmitting a MAC protocol data unit (PDU) associated with the PUSCH or the PUCCH in a bandwidth smaller than the first subset of resources. In some aspects, the apparatus 1704 may further include means for transmitting the PUSCH or the PUCCH in the first subset of resources and the second subset of resources with one or more circulate buffer bits in the second subset of resources. In some aspects, the apparatus 1704 may further include means for multiplexing the UCI and the uplink transmission. In some aspects, the apparatus 1704 may further include means for transmitting a first stage UCI to indicate whether the skipped transmission may be present. The means may be the UL component 198 of the apparatus 1704 configured to perform the functions recited by the means. As described herein, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
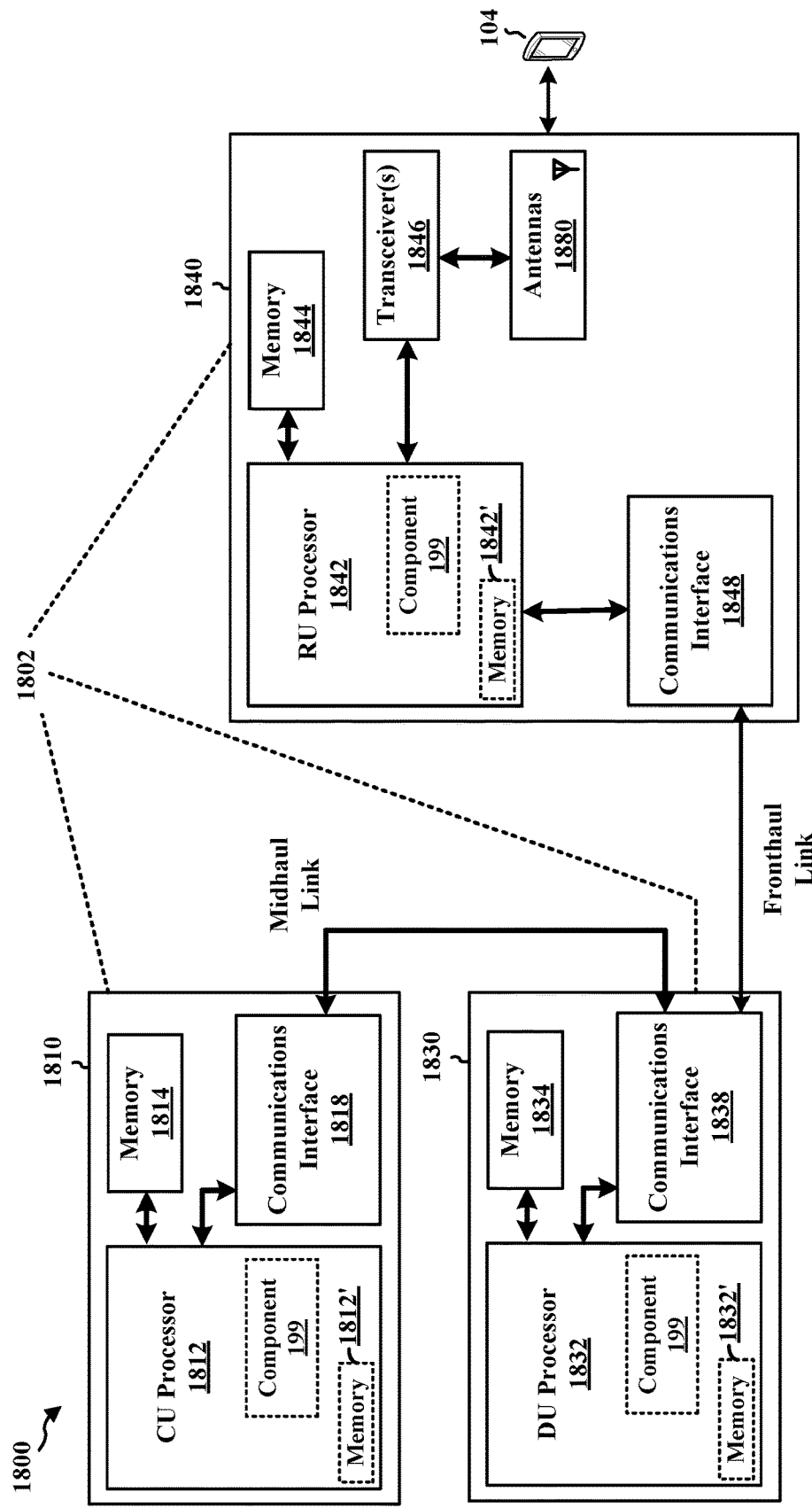
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the UL component 199 is configured to transmit a configuration of resources for a PUCCH or a PUSCH associated with UCI, where the configuration of resources may be transmitted for a UE, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. In some aspects, the UL component 199 may be further configured to receive at least one of the UCI or the uplink transmission from the UE. The UL component 199 may be within one or more processors of one or more of the CU 1810, DU 1830, and the RU 1840. The UL component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 includes means for transmitting a configuration of resources for a PUCCH or a PUSCH associated with UCI, where the configuration of resources may be transmitted for a UE, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources. In some aspects, the network entity 1802 may further include means for receiving at least one of the UCI or the uplink transmission from the UE. In some aspects, the network entity 1802 may further include means for receiving a MAC protocol data unit (PDU) associated with the PUSCH or the PUCCH in a bandwidth smaller than the first subset of resources. In some aspects, the network entity 1802 may further include means for receiving the PUSCH or the PUCCH in the first subset of resources and the second subset of resources with one or more circulate buffer bits in the second subset of resources. In some aspects, the network entity 1802 may further include means for receiving a first stage UCI to indicate whether the skipped transmission may be present. The means may be the UL component 199 of the network entity 1802 configured to perform the functions recited by the means. As described herein, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 may be a method of wireless communication at a UE, including: receiving a configuration of resources for a PUCCH or a PUSCH associated with UCI, where the configuration of resources may be received from a network entity, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources; and transmitting at least one of the UCI or the uplink transmission to the network entity.

Aspect 2 may be the method of aspect 1, where the UCI may be associated with a priority, and where the priority may be based on one of: the PUSCH, RRC signaling, a MAC-CE, or DCI associated with the UCI.

Aspect 3 may be the method of any of aspects 1-2, where transmitting at least one of the UCI or the uplink transmission to the network entity may include: transmitting a first one of the UCI or the uplink transmission based on the priority; and dropping a second one of the uplink transmission or the UCI based on the priority.

Aspect 4 may be the method of any of aspects 1-3, where the second one may be the UCI, and further including: dropping the PUSCH.

Aspect 5 may be the method of any of aspects 1-4, where the second one may be the UCI, and further including: transmitting a MAC PDU associated with the PUSCH or the PUCCH in a bandwidth smaller than the first subset of resources.

Aspect 6 may be the method of any of aspects 1-5, where the second one may be the UCI, and further including: transmitting the PUSCH in the first subset of resources and the second subset of resources with one or more circulate buffer bits in the second subset of resources.

Aspect 7 may be the method of any of aspects 1-6, further including: multiplexing the UCI and the uplink transmission.

Aspect 8 may be the method of any of aspects 1-7, where the UCI and the uplink transmission may be multiplexed based on the UCI being associated with a first cyclic shift and the uplink transmission being associated with a second cyclic shift.

Aspect 9 may be the method of any of aspects 1-8, where the UCI and the uplink transmission may be multiplexed based on frequency division multiplexing or time division multiplexing.

Aspect 10 may be the method of any of aspects 1-9, where the UCI may be a second stage UCI, and further including: transmitting a first stage UCI to indicate whether the skipped transmission may be present.

Aspect 11 may be the method of any of aspects 1-10, where the second stage UCI may be multiplexed with the PUSCH or the PUCCH in the first subset of resources after encoding the PUSCH or the PUCCH.

Aspect 12 may be the method of any of aspects 1-11, where the UCI may be multiplexed with the PUSCH or the PUCCH in the first subset of resources after encoding the PUSCH or the PUCCH.

Aspect 13 may be the method of any of aspects 1-12, where the UCI may be associated with a first cell and the PUSCH or the PUCCH may be associated with a second cell.

Aspect 14 may be the method of any of aspects 1-13, where the method is performed at an apparatus with at least one processor and a transceiver or an antenna coupled to the at least one processor, and where the transceiver or the antenna may be configured to transmit at least one of the UCI or the uplink transmission.

Aspect 15 is a method of wireless communication at a network entity, including: transmitting a configuration of resources for a PUCCH or a PUSCH associated with UCI, where the configuration of resources may be transmitted for a UE, where the UCI indicates a set of resources corresponding to a transmission in a first subset of resources associated with the PUSCH and a skipped transmission in a second subset of resources associated with the PUSCH or indicates an MCS for the PUSCH, where the UCI would overlap with an uplink transmission, where the set of resources may include the first subset of resources and the second subset of resources; and receiving at least one of the UCI or the uplink transmission from the UE.

Aspect 16 may be the method of aspect 15, where the UCI may be associated with a priority, and where the priority may be based on one of: the PUSCH, RRC signaling, a MAC-CE, or DCI associated with the UCI.

Aspect 17 may be the method of any of aspects 15-16, where a first one of the UCI or the uplink transmission may be received based on the priority; and a second one of the uplink transmission or the UCI may be not received.

Aspect 18 may be the method of any of aspects 15-17, where the second one may be the UCI, and where the PUSCH or the PUCCH may be dropped.

Aspect 19 may be the method of any of aspects 15-18, where the second one may be the UCI, and further including: receiving a MAC PDU associated with the PUSCH or the PUCCH in a bandwidth smaller than the first subset of resources.

Aspect 20 may be the method of any of aspects 15-19, where the second one may be the UCI, and further including: receiving the PUSCH in the first subset of resources and the second subset of resources with one or more circulate buffer bits in the second subset of resources.

Aspect 21 may be the method of any of aspects 15-20, where the UCI and the uplink transmission may be multiplexed.

Aspect 22 may be the method of any of aspects 15-21, where the UCI and the uplink transmission may be multiplexed based on the UCI being associated with a first cyclic shift and the uplink transmission being associated with a second cyclic shift.

Aspect 23 may be the method of any of aspects 15-22, where the UCI and the uplink transmission may be multiplexed based on frequency division multiplexing or time division multiplexing.

Aspect 24 may be the method of any of aspects 15-23, where the UCI may be a second stage UCI, and further including: receiving a first stage UCI to indicate whether the skipped transmission may be present.

Aspect 25 may be the method of any of aspects 15-24, where the second stage UCI may be multiplexed with the PUSCH or the PUCCH in the first subset of resources after encoding the PUSCH or the PUCCH.

Aspect 26 may be the method of any of aspects 15-25, where the UCI may be multiplexed with the PUSCH or the PUCCH in the first subset of resources after encoding the PUSCH or the PUCCH.

Aspect 27 may be the method of any of aspects 15-26, where the UCI may be associated with a first cell and the PUSCH or the PUCCH may be associated with a second cell.

Aspect 28 may be the method of any of aspects 15-27, where the method is performed at an apparatus with at least one processor and a transceiver or an antenna coupled to the at least one processor, and where the transceiver or the antenna may be configured to receive at least one of the UCI or the uplink transmission.

Aspect 29 is an apparatus for wireless communication at a device including a memory and at least one processor coupled to the memory and, based at least in part on information stored in the memory, configured to perform a method in accordance with any of aspects 1-14. The apparatus may include at least one of a transceiver or an antenna coupled to the at least one processor.

Aspect 30 is an apparatus for wireless communication, including means for performing a method in accordance with any of aspects 1-14.

Aspect 31 is a non-transitory computer-readable medium including instructions that, when executed by an apparatus, cause the apparatus to perform a method in accordance with any of aspects 1-14.

Aspect 32 is an apparatus for wireless communication at a device including a memory and at least one processor coupled to the memory and, based at least in part on information stored in the memory, configured to perform a method in accordance with any of aspects 15-28. The apparatus may include at least one of a transceiver or an antenna coupled to the at least one processor.

Aspect 33 is an apparatus for wireless communication, including means for performing a method in accordance with any of aspects 15-28.

Aspect 34 is a non-transitory computer-readable medium including instructions that, when executed by an apparatus, cause the apparatus to perform a method in accordance with any of aspects 15-28.

What is claimed is:

1. An apparatus for wireless communication at a user equipment (UE), comprising:
    a memory; and
    at least one processor coupled to the memory, wherein the at least one processor is configured to:
        receive a configuration of resources for a physical uplink control channel (PUCCH) or a physical uplink shared channel (PUSCH) associated with uplink control information (UCI), wherein the configuration of resources is received from a network entity, wherein the UCI indicates a set of resources corresponding to a transmission in a first subset of resources associated with the PUSCH and a skipped transmission in a second subset of resources associated with the PUSCH or indicates an modulation and coding scheme (MCS) for the PUSCH, wherein the UCI would overlap with an uplink transmission, wherein the set of resources includes the first subset of resources and the second subset of resources;
        transmit at least one of the UCI or the uplink transmission to the network entity; and
        wherein the UCI is a second stage UCI, and wherein the at least one processor is configured to: transmit a first stage UCI to indicate whether the skipped transmission is present.

2. The apparatus of claim 1, wherein the second stage UCI is multiplexed with the PUSCH or the PUCCH in the first subset of resources after encoding the PUSCH or the PUCCH.

3. The apparatus of claim 1, wherein the UCI is associated with a first cell and the PUSCH or the PUCCH is associated with a second cell.

4. The apparatus of claim 1, further comprising a transceiver or an antenna coupled to the at least one processor, and wherein the transceiver or the antenna is configured to transmit at least one of the UCI or the uplink transmission.

5. An apparatus for wireless communication at a network entity, comprising:
    a memory; and
    at least one processor coupled to the memory, wherein the at least one processor is configured to:
        transmit a configuration of resources for a physical uplink control channel (PUCCH) or a physical uplink shared channel (PUSCH) associated with uplink control information (UCI), wherein the configuration of resources is transmitted for a user equipment (UE), wherein the UCI indicates a set of resources corresponding to a transmission in a first subset of resources associated with the PUSCH and a skipped transmission in a second subset of resources associated with the PUSCH or indicates an MCS for the PUSCH, wherein the UCI would overlap with an uplink transmission, wherein the set of resources includes the first subset of resources and the second subset of resources;
        receive at least one of the UCI or the uplink transmission from the UE; and
        wherein the UCI is a second stage UCI, and wherein the at least one processor is configured to: receive a first stage UCI to indicate whether the skipped transmission is present.

6. The apparatus of claim 5, wherein the second stage UCI is multiplexed with the PUSCH or the PUCCH in the first subset of resources after encoding the PUSCH or the PUCCH.

7. The apparatus of claim 5, wherein the UCI is associated with a first cell and the PUSCH or the PUCCH is associated with a second cell.

8. The apparatus of claim 5, further comprising a transceiver or an antenna coupled to the at least one processor, and wherein the transceiver or the antenna is configured to receive at least one of the UCI or the uplink transmission.

9. A method of wireless communication at a user equipment (UE), comprising:
    receiving a configuration of resources for a physical uplink control channel (PUCCH) or a physical uplink shared channel (PUSCH) associated with uplink control information (UCI), wherein the configuration of resources is received from a network entity, wherein the UCI indicates a set of resources corresponding to a transmission in a first subset of resources associated with the PUSCH and a skipped transmission in a second subset of resources associated with the PUSCH or indicates an MCS for the PUSCH, wherein the UCI would overlap with an uplink transmission, wherein the set of resources includes the first subset of resources and the second subset of resources;
    transmitting at least one of the UCI or the uplink transmission to the network entity; and
    wherein the UCI is a second stage UCI, and wherein the at least one processor is configured to: transmit a first stage UCI to indicate whether the skipped transmission is present.

10. A method of wireless communication at a network entity, comprising:
    transmitting a configuration of resources for a physical uplink control channel (PUCCH) or a physical uplink shared channel (PUSCH) associated with uplink control information (UCI), wherein the configuration of resources is transmitted for a user equipment (UE), wherein the UCI indicates a set of resources corresponding to a transmission in a first subset of resources associated with the PUSCH and a skipped transmission in a second subset of resources associated with the PUSCH or indicates an MCS for the PUSCH, wherein the UCI would overlap with an uplink transmission, wherein the set of resources includes the first subset of resources and the second subset of resources;

receiving at least one of the UCI or the uplink transmission from the UE; and wherein the UCI is a second stage UCI, and wherein the at least one processor is configured to: receive a first stage UCI to indicate whether the skipped transmission is present.

* * * * *